(12) United States Patent
James et al.

(10) Patent No.: US 7,096,622 B2
(45) Date of Patent: Aug. 29, 2006

(54) INSECT EXTERMINATING DEVICE

(76) Inventors: Jack M. James, 1835 Springwood La., Shreveport, LA (US) 71107; Larry P. Flowers, 8625 Mira Myres Rd., Rodessa, LA (US) 71069; Lamont E. Lackman, 5599 Woodhaven Dr., Keithville, LA (US) 71047

( * ) Notice: Subject to any disclaimer, the term of this patent is extended or adjusted under 35 U.S.C. 154(b) by 62 days.

(21) Appl. No.: 10/867,271

(22) Filed: Jun. 15, 2004

(65) Prior Publication Data

US 2005/0279017 A1 Dec. 22, 2005

Related U.S. Application Data

(60) Provisional application No. 60/477,583, filed on Jun. 12, 2003.

(51) Int. Cl.
*A01M 25/00* (2006.01)
(52) U.S. Cl. .......................................... 43/124
(58) Field of Classification Search ............... 43/132.1, 43/124, 900; 47/48.5; 111/99, 95, 96, 7.1, 111/7.2; 222/191, 544; 239/271, 302
See application file for complete search history.

(56) References Cited

U.S. PATENT DOCUMENTS

| | | | |
|---|---|---|---|
| 1,856,809 A | 5/1932 | Gibson et al. | |
| 3,550,542 A | 12/1970 | Hollis | 111/95 |
| 4,413,756 A | 11/1983 | Kirley | 222/402.11 |
| 5,193,721 A | 3/1993 | Gryder | 222/341 |
| 5,325,626 A | 7/1994 | Jackson | 43/124 |
| 5,727,484 A | 3/1998 | Childs | 111/7.4 |
| 6,220,525 B1 | 4/2001 | McSherdon | 239/271 |
| 6,296,147 B1 | 10/2001 | Trocola | 222/36 |
| 6,308,454 B1 | 10/2001 | Powell | 43/124 |

*Primary Examiner*—T. Nguyen
(74) *Attorney, Agent, or Firm*—John M. Harrison

(57) ABSTRACT

An insect exterminating device which is characterized in a first embodiment by a handle having a handle base attached to a downwardly-extending probe frame fitted with a bracket and a spring for receiving an aerosol or pressurized fluid canister containing an insect treatment fluid. A probe projects from the probe frame and a spring-loaded activator button is provided on the handle base for activating the pressurized fluid canister valve to dispense the treatment fluid from the canister, through passages provided in the activator button, the handle base, the probe frame and the probe, into an insect bed. In a preferred embodiment the bracket is adjustable for accommodating pressurized fluid containers of various length. In a second embodiment the fluid canister is seated on a spring in a round frame and the treatment fluid is dispersed from the canister through a tube to the probe by pressing a spring-loaded activator button. In both embodiments the spring-loaded activator button acts as a valve to facilitate depression and dispensing treatment fluid from the pressurized fluid container on demand.

5 Claims, 10 Drawing Sheets

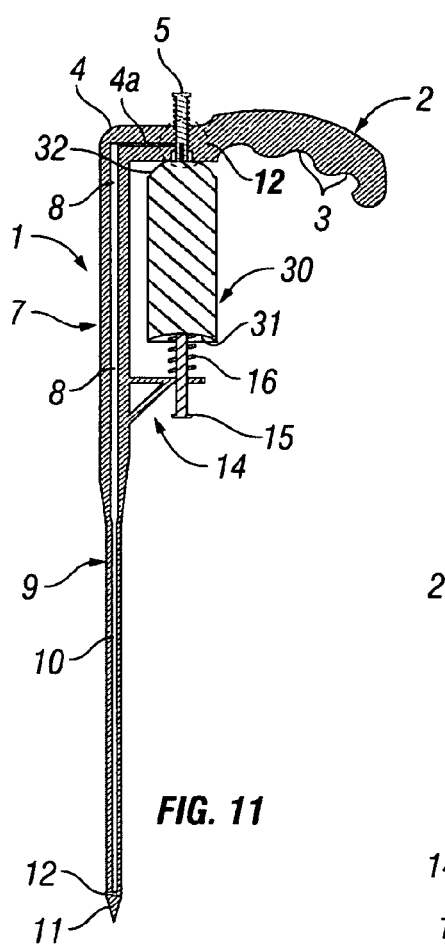

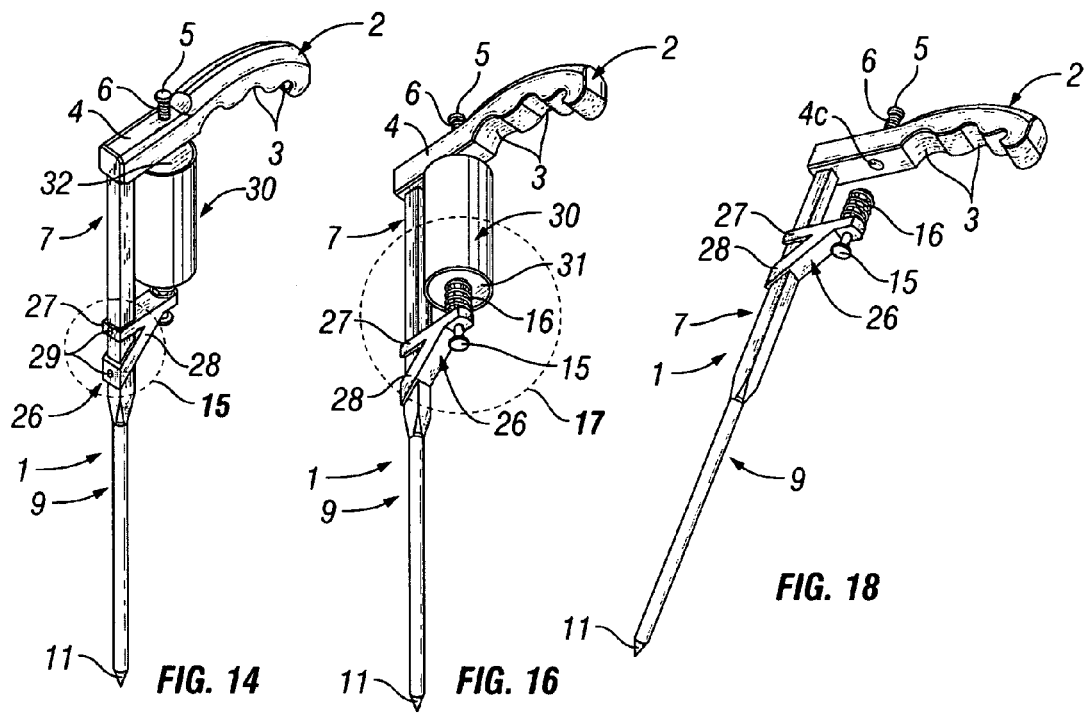
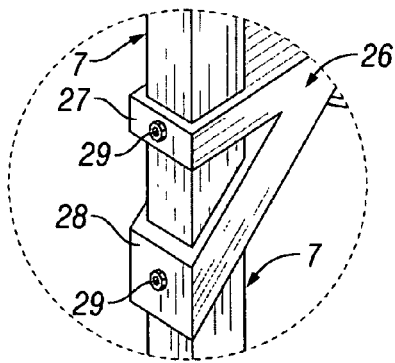
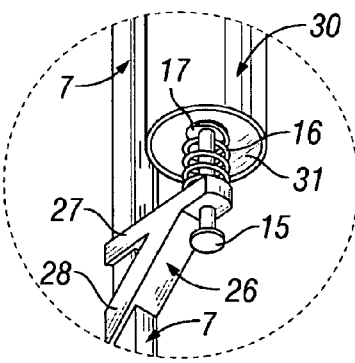
FIG. 14  FIG. 16  FIG. 18
FIG. 15  FIG. 17

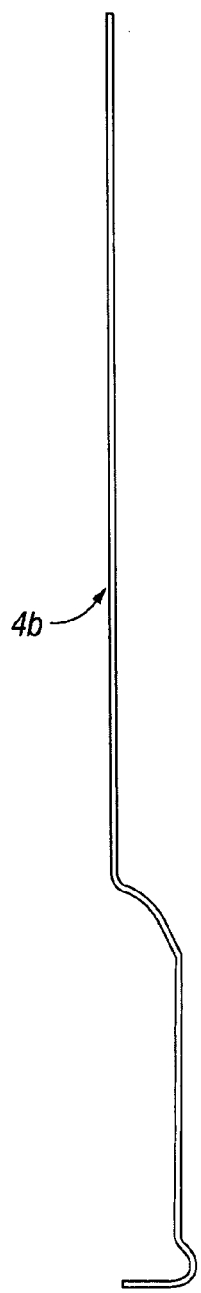
FIG. 26
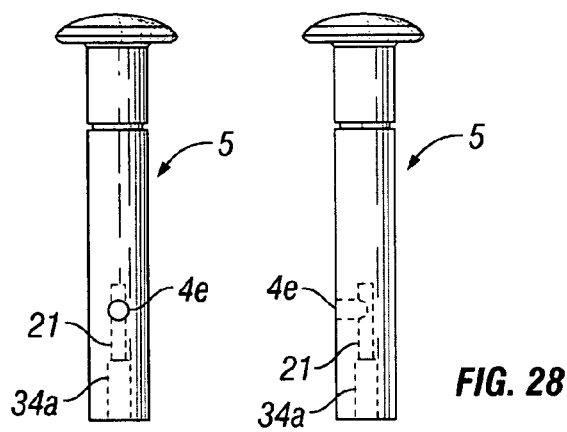
FIG. 27    FIG. 28
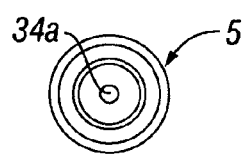
FIG. 29
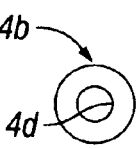 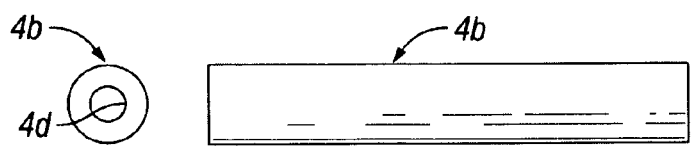
FIG. 31    FIG. 30

INSECT EXTERMINATING DEVICE

CROSS-REFERENCE TO RELATED APPLICATIONS

This application claims the benefit of and incorporates by reference prior filed copending U.S. Provisional Application Ser. No. 60/477,583, Filed Jun. 12, 2003.

SUMMARY OF THE INVENTION

This invention is characterized by an insect exterminating device which is capable of receiving and mounting pressurized aerosol or fluid canisters of various length, containing various poisons, pesticides and like treatment fluids and dispensing the treatment fluids into insect beds. In a first embodiment the insect exterminating device includes a handle; a handle base extending from the handle for receiving the operating, valved end of a pressurized fluid canister and fitted with a spring-loaded activator button; a probe frame downwardly-extending from the handle base; and a probe extending from the probe frame and terminating in a perforated tip for insertion in the insect bed. An aerosol mount bracket is either fixed or adjustably attached to the probe frame and receives the bottom end of the canister, which bottom end contacts a spring-loaded pin to removably position the top dispensing and valved end of the canister into a seat cavity on the handle base.

In a second embodiment the canister is seated on a spring in a round frame and a tube is used to transfer treatment fluid from the canister to the probe. Selective operation of the canister valve to dispense the treatment liquid is effected in both embodiments by depression of an activator button against the bias of an activator button spring to activate the canister valve and facilitate a flow of pesticide or other treatment fluid to the probe and the perforated probe tip, where the treatment fluid is dispensed through one or more openings into an insect colony such as an ant bed.

DESCRIPTION OF THE DRAWINGS

The invention will be better understood by reference to the accompanying drawings, wherein:

FIG. 11 is a side view, partially in section, of the insect exterminating device illustrated in FIG. 7, more particularly illustrating the activator button in non-depressed and non-functioning configuration as displaced upwardly in the handle base, such that treatment fluid cannot flow from the canister or container into the base bore of the handle base;

FIG. 12 is an enlarged sectional view of the non-depressed activator button and internal components that act as a valve for blocking the flow of treatment liquid from the fluid canister, through the probe frame and probe into the insect bed;

FIG. 13 is a bottom perspective view of the insect extermination device illustrated in FIGS. 1, 4 and 6, with the canister removed;

FIG. 14 is a top perspective view of an alternative design of the insect exterminating device of this invention, more particularly illustrating an adjustable aerosol mount bracket for receiving and removably mounting aerosol treatment fluid canisters of varying length;

FIG. 15 is an enlarged perspective view of the bracket base and bracket leg components of the adjustable aerosol mount bracket illustrated in FIG. 14, more particularly illustrating cap screws engaging the bracket components for adjustably mounting the adjustable aerosol mount bracket on the probe frame;

FIG. 16 is a bottom perspective view of the insect exterminating device illustrated in FIG. 14, more particularly illustrating the adjustable aerosol mount bracket;

FIG. 17 is an enlarged perspective view of the bottom portion of the canister and the adjustable aerosol mount bracket illustrated in FIG. 16;

FIG. 18 is a bottom perspective view of the insect exterminating device illustrated in FIGS. 14 and 16 with the canister removed, more particularly illustrating adjustment of the adjustable aerosol mount bracket on the probe frame;

FIG. 26 is a plan view of a typical base bore tube element of the insect exterminating device illustrated in FIG. 19;

FIG. 27 is a front elevation of an activator button element of the insect exterminating device illustrated in FIGS. 19 and 20;

FIG. 28 is a side elevation of the activator button illustrated in FIG. 27;

FIG. 29 is a bottom view of the activator button illustrated in FIGS. 27 and 28;

FIG. 30 is a side view of an enlarged section of the base bore tube illustrated in FIG. 26 of the insect exterminator device;

FIG. 31 is an end view of the enlarged base tube bore illustrated in FIG. 30;

DESCRIPTION OF THE PREFERRED EMBODIMENTS

Figure 6:
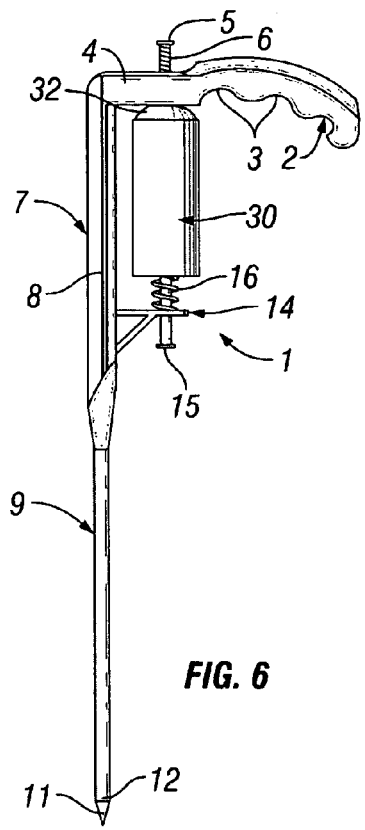
FIG. 6 is a side view of the insect exterminating device illustrated in FIGS. 1 and 4.
Figure 1:
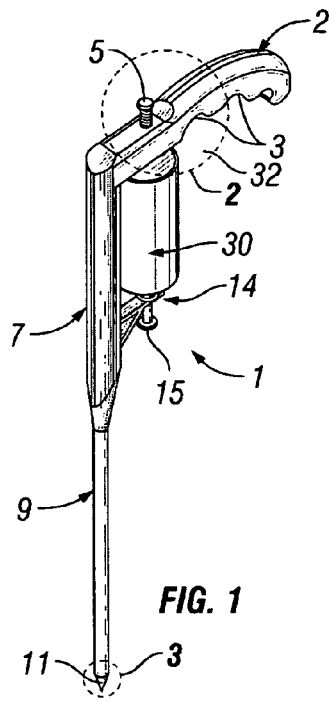
FIG. 1 is a top perspective view of a first preferred embodiment of the insect exterminating device of this invention, with an aerosol or pressurized canister or container in functional, yet removable, position therein.
Figure 4:
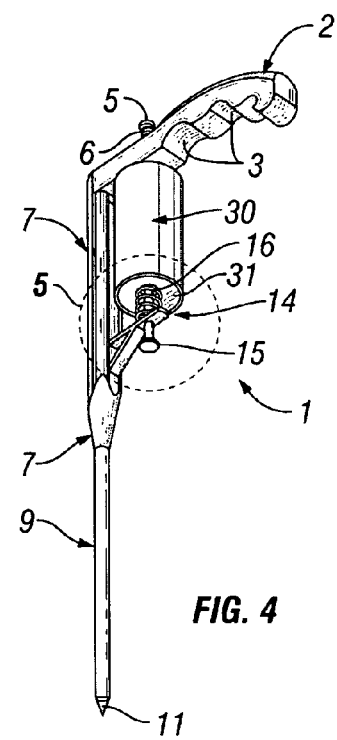
FIG. 4 is a bottom perspective view of the insect exterminating device illustrated in FIG. 1, more particularly illustrating a preferred fixed aerosol mount bracket for removably mounting an aerosol or pressurized fluid canister or container of common length in the insect exterminating device.
Figure 2:
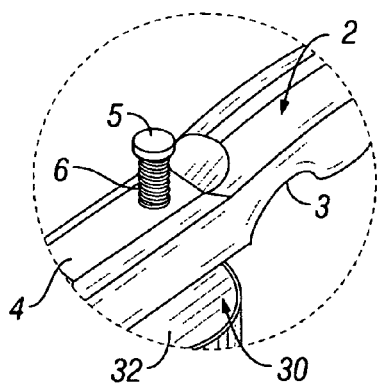
FIG. 2 is an enlarged perspective view of the activator button and handle base components of the insect exterminating device illustrated in FIG. 1, more particularly illustrating a typical spring-loading of the activator button.
Figure 3:
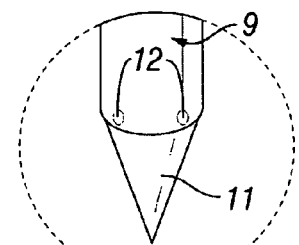
FIG. 3 is an enlarged view of the bottom end of the downwardly-extending probe element, more particularly illustrating the probe tip and probe openings for dispensing the contents of the pressurized canister or container illustrated in FIG. 1, into a subterranean insect colony or bed such as an ant bed.
Figure 5:
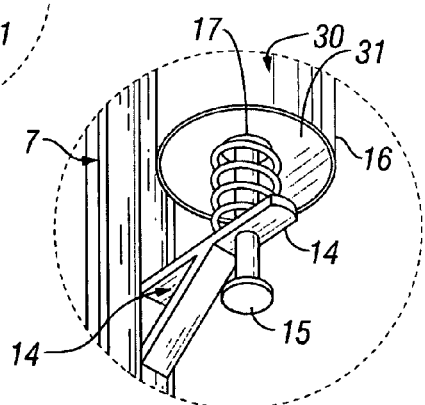
FIG. 5 is an enlarged perspective view of the fixed aerosol mount bracket element illustrated in FIG. 4, more particularly illustrating an aerosol mount pin and aerosol mount pin spring for removably seating the canister in the insect exterminating device.

Referring initially to FIGS. 1–7 of the drawings, in a first preferred embodiment of the invention the insect exterminating device of this invention is generally illustrated by reference numeral 1. The insect exterminating device 1 is characterized by a handle 2, typically shaped to define finger grips 3, and extending from a handle base 4. An activator button 5 is seated in the top of the handle base 4 and is spring-loaded into position for depression by an activator button spring 6 (FIG. 2) for purposes which will be hereinafter further described. A probe frame 7 extends downwardly from the handle base 4 opposite the handle 2 and typically tapers to define or receive a probe 9, fitted with a probe tip 11 at the extending bottom end thereof. A fixed aerosol mount bracket 14 is secured by any suitable means to the probe frame 7, as further illustrated in FIGS. 1, 4, 5 and 6 of the drawings and an aerosol mount pin 15 slidably extends through an opening (not illustrated) provided in the fixed aerosol mount bracket 14, and has a flared contact end 17 (FIG. 5) to engage the canister bottom 31 of a conventional pressurized insect treatment fluid canister 30 of standard size, as further illustrated in FIGS. 1, 4, 5 and 6 of the drawings. In a preferred embodiment an aerosol mount pin spring 16 is interposed between the fixed aerosol mount bracket 14 and the contact end 17, resting against the canister bottom 31 of the canister 30, to removably bias the canister 30 in position between the fixed aerosol mount bracket 14 and the handle base 4. Accordingly, it will be appreciated from a consideration of FIGS. 1, 4, 5 and 6 of the drawings that the canister 30 can be quickly and easily removed from and positioned between the fixed aerosol mount bracket 14 and the handle base 4 by exerting downward pressure on the canister 30 and depressing the aerosol mount pin 15 and the companion aerosol mount pin spring 16.

Figure 7:
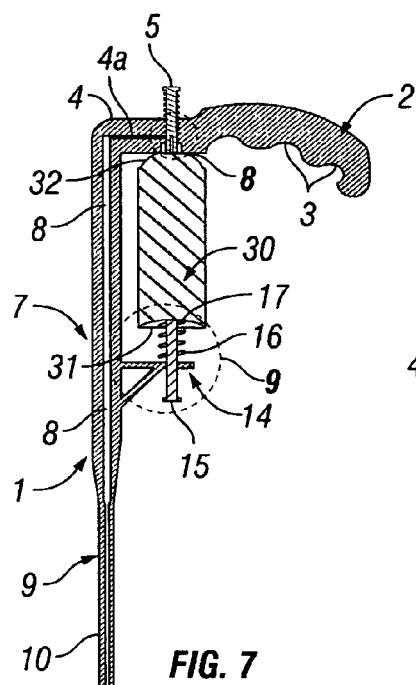
FIG. 7 is a side view, partially in section, of the insect exterminating device illustrated in FIG. 6, more particularly illustrating the depressed activator button and the base bore therein that communicates with the pressurized fluid canister valve and the internal components of the activator button, the connecting frame bore provided in the probe frame and the probe bore extending through the probe and communicating with the frame bore, which probe bore further communicates with the probe openings in the lower end of the probe, to disperse the contents of the canister into an insect bed.
Figure 8:
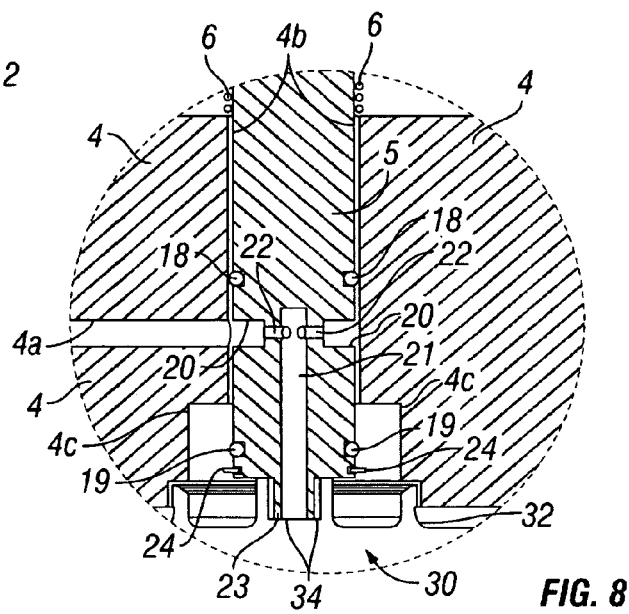
FIG. 8 is an enlarged view of the internal configuration of the depressed activator button and valve element illustrated in FIG. 7, more particularly illustrating the fluid channels communicating between the canister valve and the base bore of the handle base, to facilitate a flow of treatment fluid under pressure from the canister, through the respective internal passages of the insect exterminating device.
Figure 9:
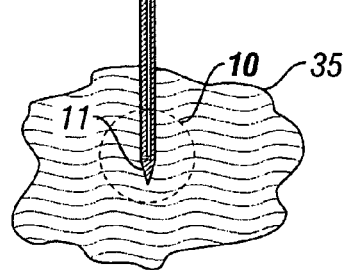
FIG. 9 is an enlarged sectional view of the fixed aerosol mount bracket illustrated in FIG. 7, more particularly illustrating the aerosol mount pin and associated aerosol mount pin spring for removably securing the aerosol canister or container in place on the fixed aerosol mount bracket.
Figure 10:
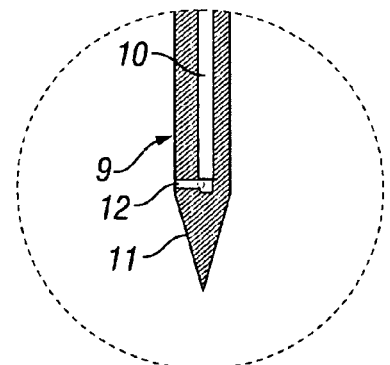
FIG. 10 is an enlarged sectional view of the lower end of the probe illustrated in FIG. 7, and more particularly illustrating the probe tip and the probe bore extending downwardly and communicating with probe openings for dispensing the contents of the treatment fluid canister into the insect bed.

Referring now to FIGS. 7–10 of the drawings, under circumstances where a canister 30 is fitted on the biased contact end 17 of the aerosol mount pin 15 at the canister bottom 31 and on the handle base 4 at the canister top 32, the insect exterminating device 1 is in functional configuration ready for use. Accordingly, when the activator button 5 is depressed against the tension in the activator button spring 6 as illustrated in FIG. 7, the activator button 5 is extended downwardly in the button seat 4b, through the button seat cavity 4c provided in the handle base 4 by thumb pressure, to the position illustrated in FIG. 8 of the drawings. As further illustrated in FIG. 8 the top O-ring seal 18 and the bottom O-ring seal 19 are seated in spaced-apart ring grooves and seal the activator button 5 in the button seat 4b to prevent treatment liquid under pressure in the canister 30 from migrating upwardly to the exterior of the handle base 4 and the handle 2 when the insect exterminating device 1 is in use. Furthermore, when the activator button 5 is in the depressed position illustrated in FIGS. 7 and 8, the radial activator button groove 20 provided in the activator button 5 is aligned with the activator button bore 21, extending longitudinally upwardly into the activator button 5 from the activator button engaging tip 23, at the extreme bottom end of the activator button 5. The activator button engaging tip 23 engages and opens the canister valve 34 in the canister 30. A pair of activator button bore channels 22 extend axially from the activator button bore 21 to the activator button groove 20 to facilitate a flow of treatment fluid or liquid under pressure from the canister 30 upwardly through the activator button bore 21 and the activator button bore channels 22, into the activator button groove 20. This treatment fluid or liquid, such as a pesticide, for example, is then caused to flow by canister pressure from the activator button groove 20 into the aligned base bore 4a and from there into the vertically-oriented frame bore 8 in the probe frame 7 and then downwardly into the probe bore 10 of the probe 9 and finally, through the probe openings 12 located above the probe tip 11, into an insect bed 35, as further illustrated in FIG. 7. Accordingly, it will be further appreciated from a consideration of FIGS. 8 and 9 of the drawings that depression of the activator button 5 against the spring tension in the activator button spring 6 facilitates a controlled flow of treatment fluid or liquid under pressure, on demand from the canister 30, into the insect bed 35. The canister 30 is maintained in functional configuration as illustrated in FIG. 7 during this operation because of the tension in the aerosol mount spring 16, applied against the contact end 17 of the aerosol mount pin 15, which tension exceeds the tension in the activator button spring 6 that biases the activator button 5 in the upward configuration.

Referring now to FIGS. 11 and 12 of the drawings, under circumstances where thumb pressure is released from the activator button 5 to terminate operation of the insect exterminating device 1, the activator button spring 6 causes the activator button 5 to move upwardly as illustrated in FIGS. 11 and 12, with the activator button retainer 24, seated in a groove in the lower end of the activator button 5, engaging the walls of the button seat 4b, thus misaligning the activator button groove 20 and the corresponding base bore 4*a* in the handle base 4 (FIG. 12). Furthermore, the activator button engaging tip 23 and the bottom end of the activator button bore 21 are removed from contact with the aligned canister valve 34 of the canister 30 in the bottom seat cavity 4*c*, thus releasing pressure from the canister valve 34 and preventing a flow of treatment fluid or liquid under pressure from the canister 30 into the activator button bore 21. Accordingly, the insect exterminator device 1 is now in non-functional configuration and no treatment fluid or liquid will flow from the probe openings 12 until the activator button 5 is again pressed downwardly against the bias of the activator button spring 6 to again place the insect exterminating device 1 in the functional configuration illustrated in FIGS. 7 and 8 of the drawings.

As further illustrated in FIG. 13, the button seat cavity 4*c* provided in the bottom surface of the handle base 4 receives the activator button 5, extending from the canister valve 34 and positioned in the upper end of the aerosol canister 30 (FIG. 12) and stabilizes the aerosol canister 30 in position by operation of the bias in the aerosol mount pin spring 16 on the aerosol mount pin 15. Accordingly, a canister 30 of standard length can be quickly and easily inserted in functional position with the canister top 32 engaging the bottom surface of the handle base 4, the canister valve 34 seated in the base of the button seat cavity 4*c* and the canister bottom 31 seated on the contact end 17 of the aerosol mount pin 15 against the bias of the aerosol mount pin spring 16, to render the insect exterminating device 1 operable (FIG. 11).

Referring to FIGS. 14–18 of the drawings, in an alternative design the insect exterminating device 1 is fitted with an adjustable aerosol mount bracket 26, having a bracket base 27 and a bracket leg 28, each attached to the probe frame 7 in an adjustable manner, typically using cap screws 29. Accordingly, referring to FIGS. 16 and 18 of the drawings, the adjustable aerosol mount bracket 26 is capable of being slidably adjusted up and down on the probe frame 7 by selectively loosening and tightening the cap screws 29, to a position that will accommodate a canister 30 of substantially any length. Once so adjusted, the cap screws 29 are tightened and the adjustable aerosol mount bracket 26 is used to seat the canister 30 in the same manner as illustrated in FIGS. 1–13 of the drawings and described above, utilizing the aerosol mount pin 15 and corresponding aerosol mount pin spring 16.

Figure 19:
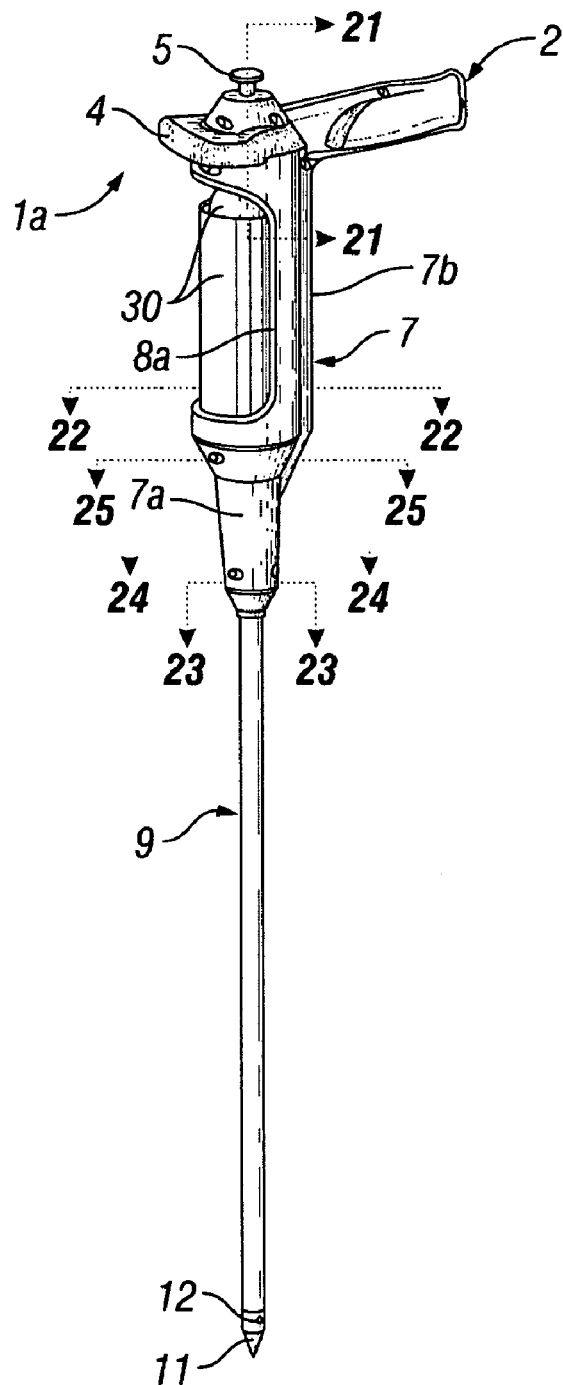
FIG. 19 is a perspective view of a second preferred embodiment of the insect exterminating device of this invention.
Figures 20A, 20B:
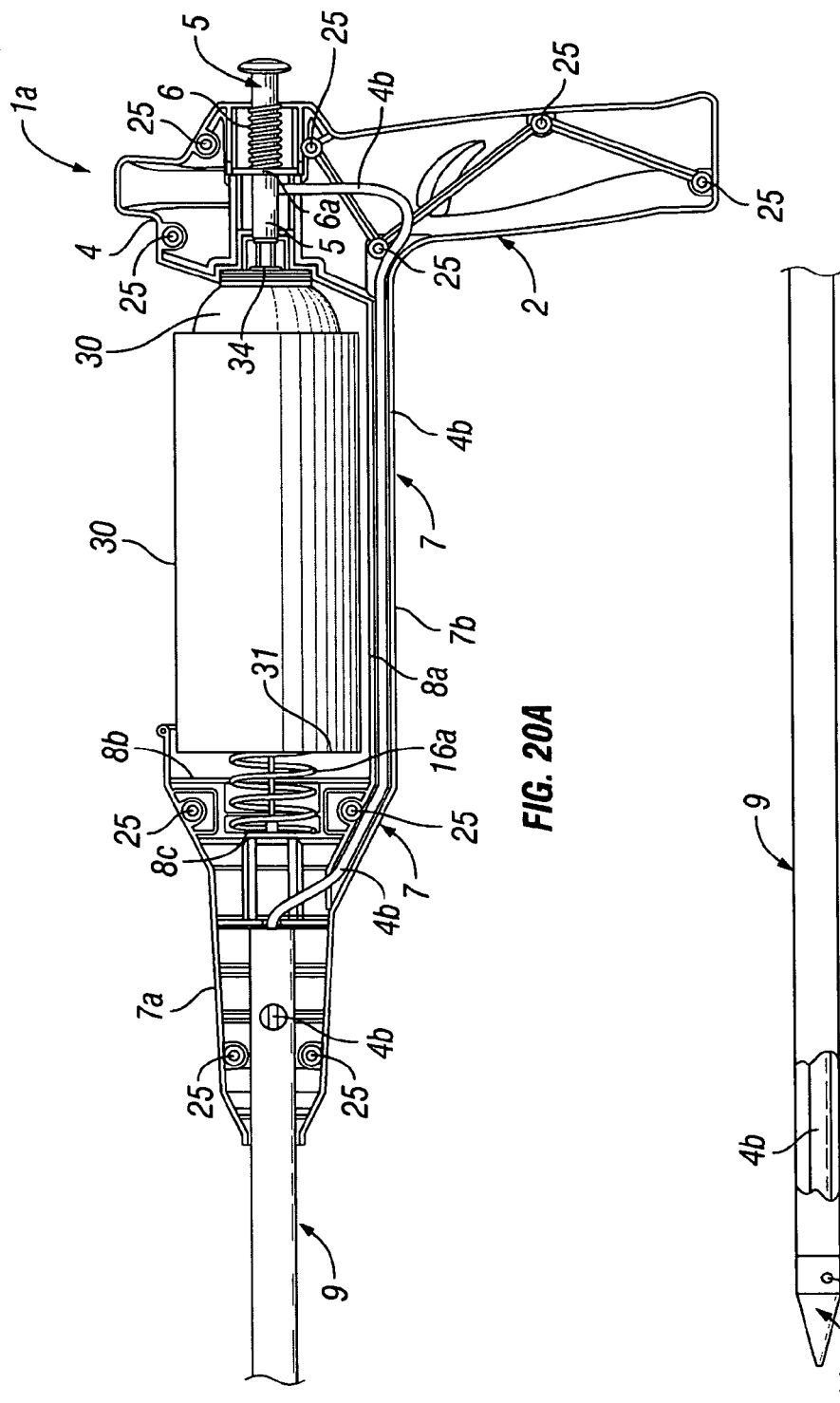
FIG. 20 is a longitudinal sectional view of the insect exterminating device illustrated in FIG. 19.

Referring now to FIGS. 19 and 20 of the drawings, a second preferred embodiment of the insect exterminating device of this invention is generally illustrated by reference numeral 1*a*. The insect exterminating device 1*a* includes a rounded, split probe frame 7 which is typically joined by housing mount screws 25 and tapers at the bottom end to define a probe mount 7*a*, from which extends an elongated, hollow probe 9. The probe 9 is fitted with a probe tip 11 having probe openings 12, typically in the same manner as described herein with respect to the first embodiment of the insect exterminating device 1 illustrated in FIGS. 1–18 of the drawings. A canister window 8*a* is provided in the rounded probe frame 7 to facilitate insertion of an aerosol canister 30 and seating the canister bottom 31 of the aerosol container 30 adjacent to a seat bracket 8*b*, as further illustrated in FIGS. 19 and 20. A canister spring 16*a* is seated on a canister spring seat 8*c* and serves to engage the canister bottom 31 and bias the aerosol canister 30 in the probe frame 7 (FIG. 20). A handle 2 is fitted to the top end of the probe frame 7 and terminates in a handle base 4 which slidably receives an activator button 5. The activator button 5 extends through an opening in the handle base 4 to the canister valve 34 of the canister 30, as further illustrated in FIG. 20 of the drawings. An activator button spring 6 is provided on the activator button 5 inside the handle base 4 and seats on a spring seat 6*a*, fixed inside the handle base 4 (FIG. 20) to facilitate depression of the activator button 5 against the tension in the activator button spring 6 and allow selective operation of the canister valve 34 located on the top end of the canister 30 at the bottom of the handle base 4, as further illustrated in FIG. 20. An elongated base bore tube 4*b* extends through a tube plenum 7*b* provided in the probe frame 7 and one end of the base bore tube 4*b* connects to the activator button 5, as hereinafter further described, while the other end of the base bore tube 4*b* extends inside the probe mount 7*a* and projects downwardly through the probe bore 10 of the probe 9. Accordingly, depression of the activator button 5 by thumb or finger pressure applied against the tension in the activator button spring 6 forces the activator button 5 against the canister valve 34 and causes the contents of the canister 30 to flow through the interior of the activator button 5, through the base bore tube 4*b* in the probe bore 10 to the probe tip 11, as hereinafter further described.

Figure 21:
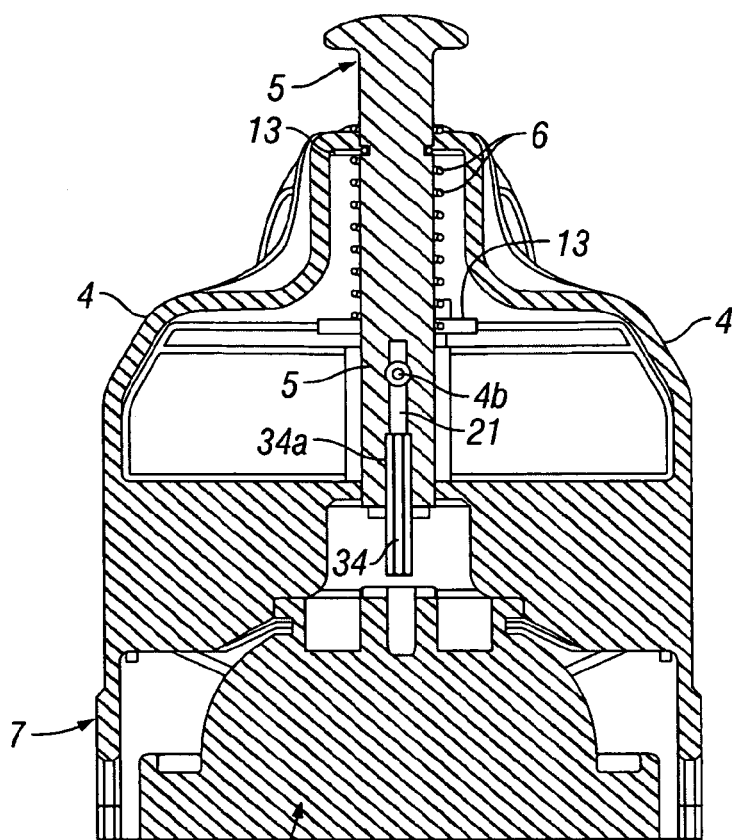
FIG. 21 is a sectional view taken along line 21—21 of the top section of the probe frame element of the insect exterminating device illustrated in FIG. 19.
Figure 22:
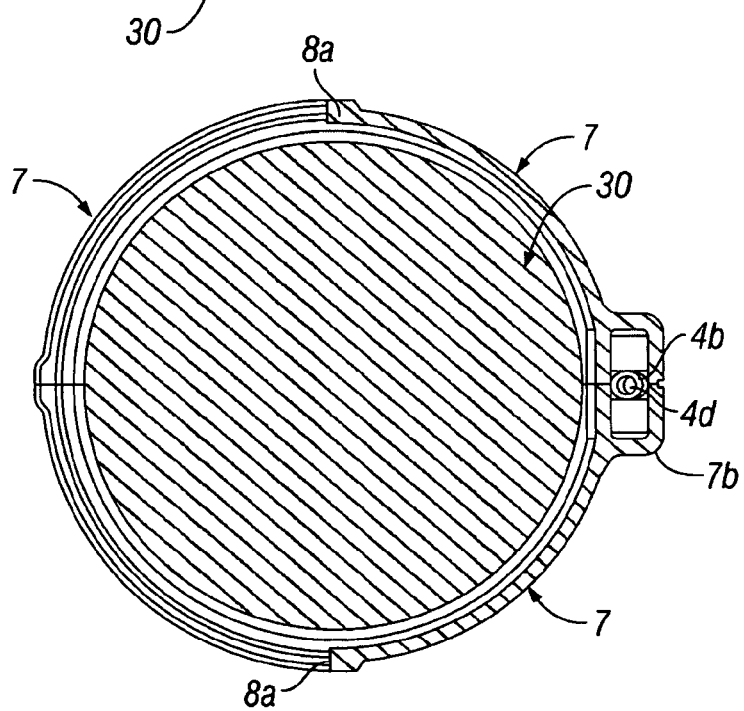
FIG. 22 is a sectional view taken along line 22—22 of the insect exterminating device illustrated in FIG. 19.
Figure 23:
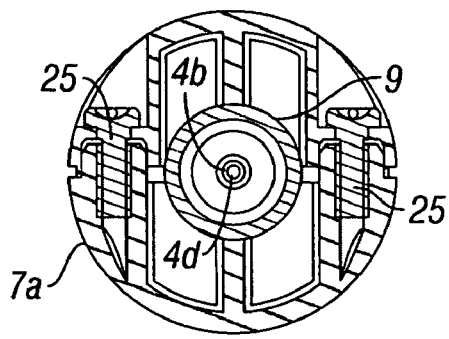
FIG. 23 is a sectional view taken along line 23—23 of the insect exterminating device illustrated in FIG. 19.
Figure 24:
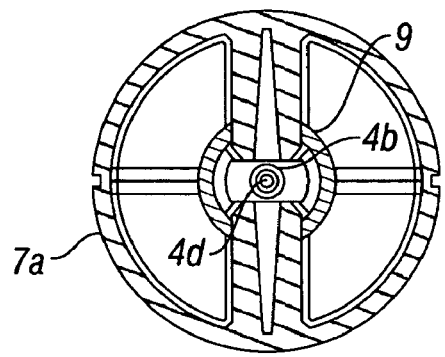
FIG. 24 is a sectional view taken along line 24—24 of the insect exterminating device illustrated in FIG. 19.
Figure 25:
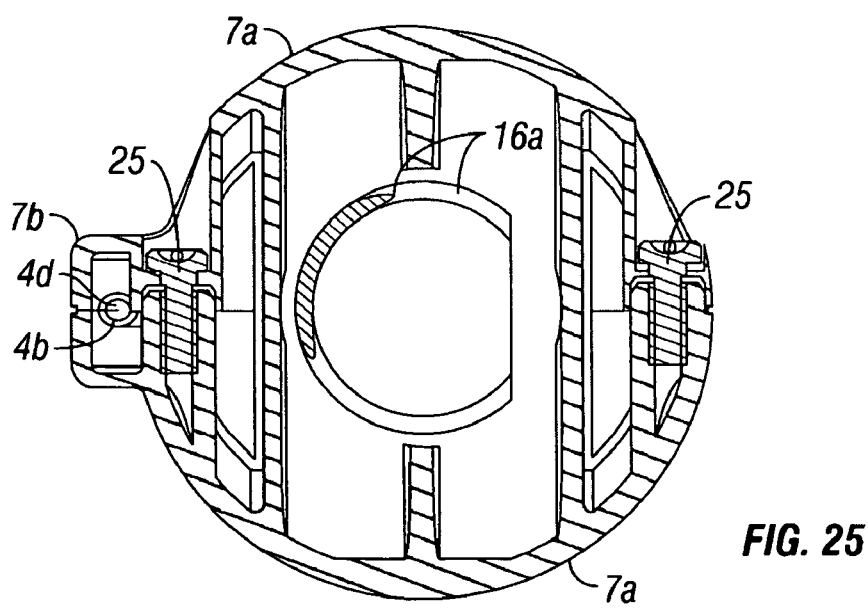
FIG. 25 is a sectional view taken along line 25—25 of the insect exterminating device illustrated in FIG. 19.
Figure 32:
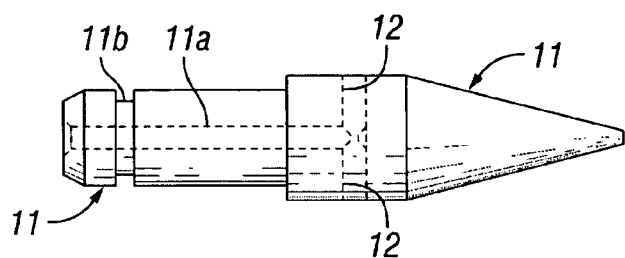
FIG. 32 is a side view of a typical probe tip element of the insect exterminating device illustrated in FIGS. 19 and 20.
Figure 33:
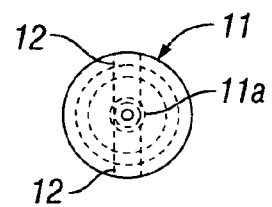
FIG. 33 is a top view of the probe tip illustrated in FIG. 32.
Figure 34:
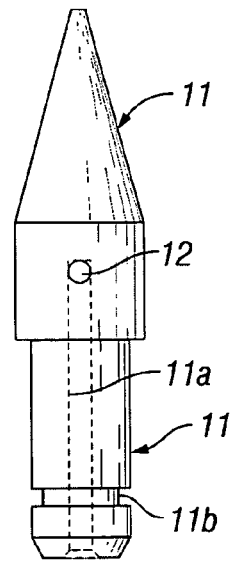
FIG. 34 is a front view of the probe tip illustrated in FIGS. 32 and 33.

The flow of the pressurized contents of the aerosol canister 30 is facilitated by a longitudinal activator button bore 21 provided in the activator button 5, as illustrated in FIG. 21 of the drawings wherein the top end of the base bore tube 4*b* is inserted in a radial opening 4*e* (FIGS. 27 and 28) communicating with the activator button bore 21. As further illustrated in FIGS. 21 and 27–29 of the drawings, a valve access bore 34*a* is drilled or otherwise provided in the base of the activator button 5 and communicates with the activator button bore 21, for accommodating the canister valve 34, as illustrated in FIG. 21. Depression of the activator button 5 against the tension in the activator button spring 6 thus causes the canister valve 34 to move downwardly, along with the valve access bore 34*a*, to activate the canister valve 34 and facilitate a flow of insecticide or other pressurized aerosol material located inside the aerosol canister 30, upwardly through the hollow interior of the canister valve 34 and into the activator button bore 21 and from the activator button bore 21 into the base bore tube 4*b* inserted in the radial opening 4*e*. As illustrated in FIGS. 26, 30 and 31 the base bore tube 4*b* has a tube bore 4*d* that receives the insecticide or other fluid located under pressure in the aerosol canister 30 and transmits it to the probe tip 11 and from the probe tip 11 through the probe openings 12, to a target such as an insect bed 35.

Referring now to FIGS. 20 and 32–34 of the drawings the probe tip 11 is characterized by a tapered tip and an internal probe tip bore 11 that aligns with the probe bore 10 in the probe 9 and communicates with the base bore tube 4*b* and with probe openings 12 extending radially from the probe tip bore 11, to facilitate a flow of insecticide or other fluid from the probe tip 11 into the surrounding earth or soil target area. The probe tip 11 can be threaded on the probe 9 or mounted thereon by means of a clip or snap-ring (not illustrated) which typically engages a clip groove 11*b* and a corresponding internal groove (not illustrated) provided in the extending end of the probe 9, according to the knowledge of those skilled in the art.

It will be appreciated from a consideration of the drawings and the above description that the insect exterminating device 1 of this invention in both embodiments, is characterized by great flexibility and utility, in that it can receive and removably mount a pressurized insect treatment fluid canister 30 of substantially any size, as illustrated in the drawings, including aerosol or pressurized fluid containers of common size. Furthermore, operation of the activator button 5 as a valve in each case serves to positively control the dispensing of treatment fluid or liquid under pressure from the canister 30 through the probe bore 10 and the probe 9, to dispense from the probe openings 12 into the insect bed 35, as illustrated in FIG. 7.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An insect exterminating device for removably mounting a pressurized canister filled with insect treatment fluid and having a canister dispensing valve for injecting the insect treatment fluid from the pressurized canister into an insect bed, said device comprising a handle; a handle base extending from said handle and a probe frame projecting from said handle base; a probe extending from said probe frame and a probe bore provided in said probe; a seat bracket carried by said probe frame for removably receiving the pressurized canister between said seat bracket and said handle base in said device; a button valve slidably seated in said handle base, said button valve spaced from the canister dispensing valve of the pressurized canister; and a tube extending from said button valve to said probe bore in said probe, wherein depression of said button valve engages and actuates the canister dispensing valve in the pressurized canister and treatment fluid flows from the pressurized canister through the canister dispensing valve and into said button valve, said tube and said probe bore, into the insect bed.

2. The insect exterminating device of claim 1 comprising a button spring provided on said button valve for normally biasing said button valve in a non-depressed configuration and configuring said insect exterminating device in non-operating mode.

3. The insect exterminating device of claim 2 comprising a mount spring interposed between said seat bracket and the pressurized canister for removably biasing the pressurized canister between said seat bracket and said handle base.

4. The insect exterminating device of claim 2 comprising a probe tip provided on said probe for penetrating the insect bed and at least one probe opening provided in said probe tip, said probe opening communicating with said tube for dispensing the treatment fluid from said probe bore and said probe opening into the insect bed.

5. The insect exterminating device of claim 4 comprising a tube plenum provided on said handle base and said probe frame for accommodating said tube.

* * * * *